Jan. 2, 1923.
B. W. KADEL.
DRAFT YOKE AND METHOD OF MANUFACTURING SAME.
FILED AUG. 16, 1920.
1,440,998
2 SHEETS-SHEET 1
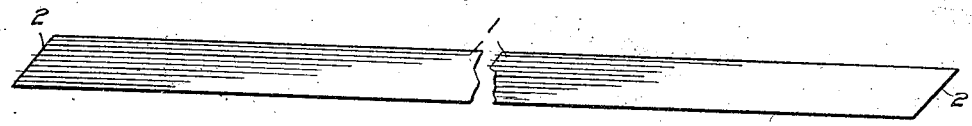
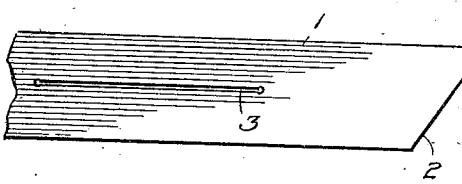
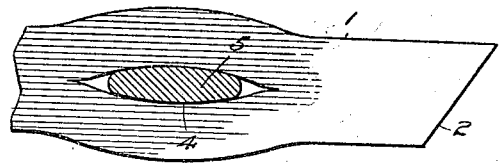
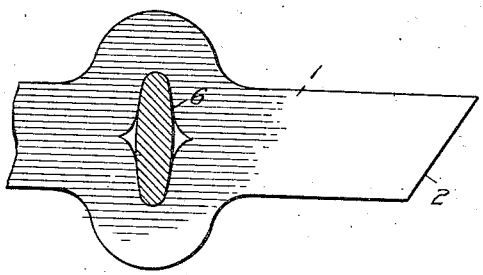
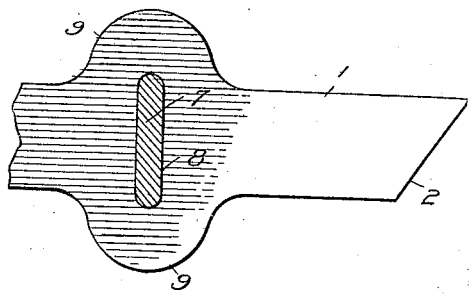
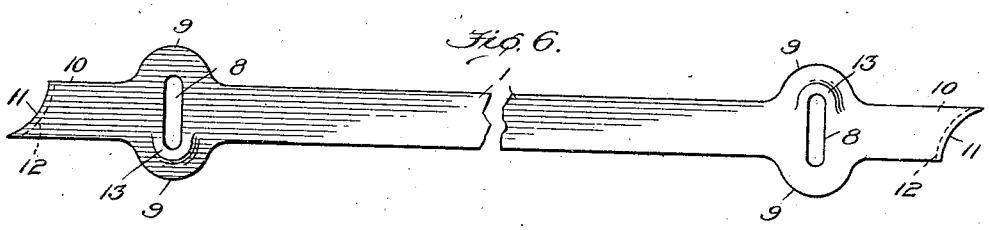
Witness
Edwin L. Bradford
Inventor
Byro W. Kadel
By Ernest H. Mechlin
his Attorney

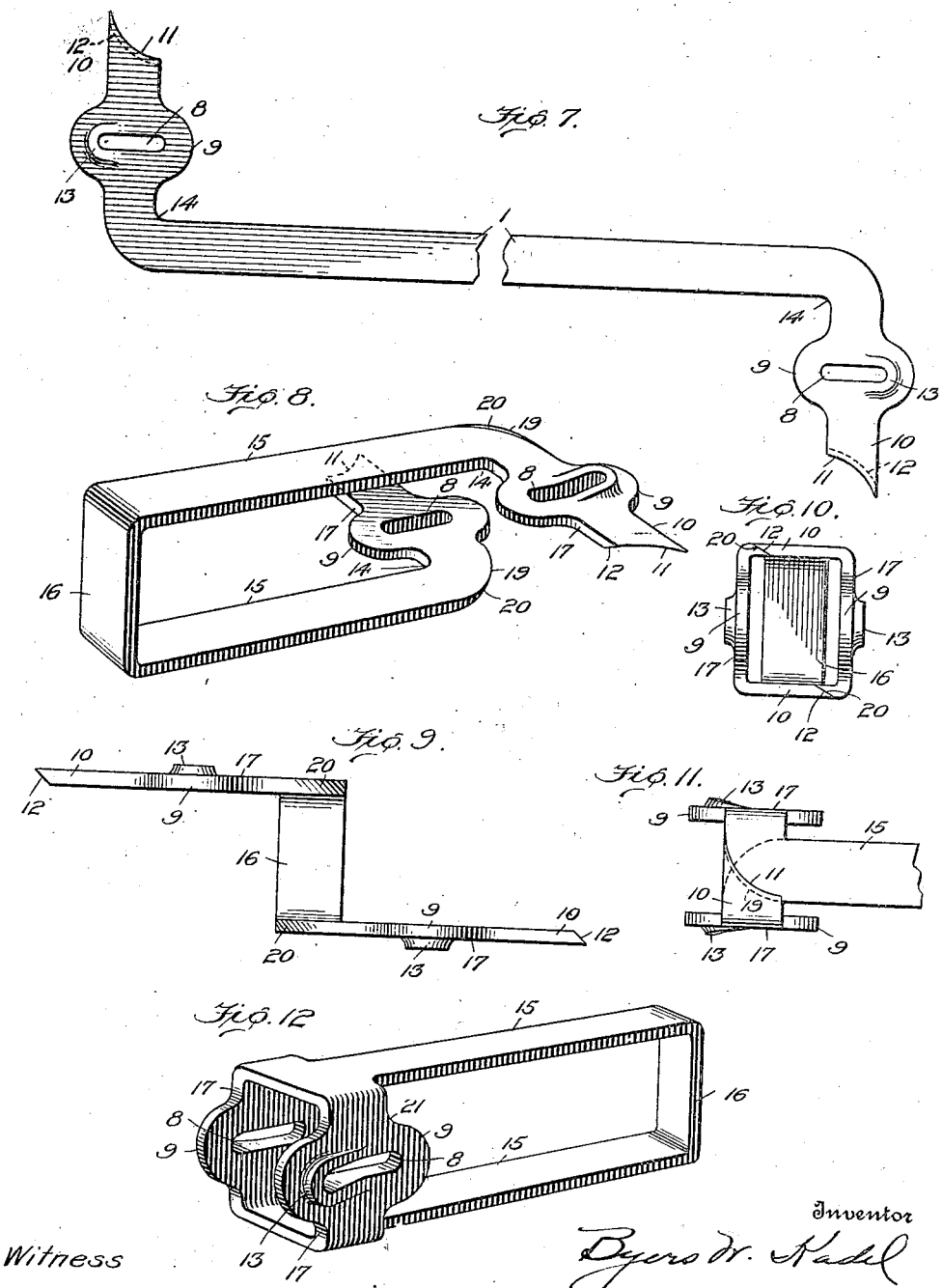

Patented Jan. 2, 1923.

1,440,998

UNITED STATES PATENT OFFICE.

BYERS W. KADEL, OF BALTIMORE, MARYLAND, ASSIGNOR TO THE T. H. SYMINGTON COMPANY, OF NEW YORK, N. Y., A CORPORATION OF DELAWARE.

DRAFT YOKE AND METHOD OF MANUFACTURING SAME.

Application filed August 16, 1920. Serial No. 403,749.

*To all whom it may concern:*

Be it known that I, BYERS W. KADEL, a citizen of the United States, residing at Baltimore, in the State of Maryland, have invented certain new and useful Improvements in Draft Yokes and Methods of Manufacturing Same; and I do hereby declare the following to be a full, clear, and exact description of the invention, such as will enable others skilled in the art to which it appertains to make and use the same.

The invention relates to yokes for railway draft rigging, and more particularly to a method by which such yokes may be manufactured from wrought metal by the combined forging and welding process.

A principal object of my invention, broadly stated, is to provide a process for the production of a hooded yoke from a single piece of metal by a combined forging and welding process.

Another object is to provide a method of manufacturing hooded draft gear yokes wherein there is no waste of material.

Another object of the invention is to produce an exceedingly strong, simple and reliable hooded yoke adapted for connection to the standard type of coupler now employed in freight service without modification or change in the form of attachment.

There are other objects of my invention which will hereinafter more fully appear from the detailed description of the method or process, particularly when the same are taken in connection with the accompanying drawing wherein I have illustrated the important steps of the process and in which:—

Figure 1 is a plan view of a bar cut to form a yoke.

Figure 2 shows the initial step in producing a key slot in the yoke arm.

Figure 3 shows the second step in the production of the key slot, the slot being widened by the introduction of a wedge bar.

Figure 4 is a plan view illustrating the form of key slot resulting from the rotation of the wedge bar.

Figure 5 shows the key slot finished to exact dimensions, the key slot die being shown in cross section.

Figure 6 is a plan view of the yoke forming bar showing the same with the initial forging steps completed.

Figure 7 illustrates the bar with its end portions bent in diametrically opposite directions.

Figure 8 is a perspective view of the yoke bar showing the same bent into loop form.

Figure 9 is a front elevation of the construction shown in Fig. 8.

Figure 10 is a front elevation of the completed yoke showing the manner in which the yoke arms are bent to form the hooded head.

Figure 11 is a top plan view of a fragmentary portion of the yoke showing the lapping of one yoke arm with the opposite yoke arm prior to the welding process.

Figure 12 is a perspective view of the finished article.

Throughout the specification and drawings like parts are designated by like reference characters.

Before describing the process in detail it is here pointed out that the steps which may be hereinafter described in sequence do not necessarily occur in the sequence in which the same are set forth and may be advantageously employed in other sequences, as will be at once apparent to those skilled in the art.

In connection with the method of forming the key slot hereinafter set forth, it is to be understood that while this method forms one of the coordinate steps of my process, it may be advantageously used in other types of yokes than the one here illustrated.

In carrying out the process I cut from suitable bar stock a bar 1 and preferably cut the end portions thereof at an angle to the longitudinal axis of the bar stock, as shown at 2. It will of course be understood that the bar 1 is of suitable width and thickness to produce a strong and reliable yoke structure. The exact dimensions of this bar may be varied, depending upon the character of service for which the yoke produced therefrom is intended.

One method of forming a key slot in the bar stock is to make a cut or slot on substantially the center line of the bar 1 and preferably closely adjacent each end, as indicated in Fig. 2. These slots 3 are then widened out as at 4 by the insertion therein of a wedge bar or member 5. The wedge bar is then given a rotation of 90° and at the same time the bar 1 is headed or forced into the shape shown in Fig. 4, thus forming a slot extending transversely of the direction of the bar 1, as clearly shown at 6 in the said figure. Thereafter this slot 6 may be shaped to the regulation key slot size by means of suitable forging and pressing processes, the key slot being preferably formed around a die 7. The key slot formed by said die will hereinafter be designated by the reference numeral 8, the numerals 3, 4, 6 being understood to indicate the formative stages of the said key slot 8. Not only do I produce by this method a key slot 8 which extends transversely of the bar 1, but by using this process to produce the slot I form on opposite ends of the bar the enlargements 9 which, as will hereinafter be more fully described, comprise the side portions of the hooded head of the yoke. At the completion of this portion of the process the bar 1 is provided at or near the opposite ends with enlargements 9 and the end portions 10 of the bar are curved as at 11 and undercut as at 12. Each key slot 8 is provided adjacent one end with a flange or bearing 13, as clearly indicated in Fig. 6.

The next step which may be followed in the process is to bend the ends of the bar 1 in opposite directions, as clearly shown in Fig. 7, each bend being located at a point 14 intermediate the enlargements 9.

The bar 1 is then shaped by any suitable process into a loop or yoke form comprising arms 15 and a connecting member 16. The portions 17 of the arms 15 which project outwardly from the bends 14 are adapted to form the hood portion of the completed yoke, and this portion of the yoke is produced by bending each arm 17 first at right angles to the plane of its connected arm and then again bending the end portions 10 thereof in a plane parallel to the associated arm 15 and into a vertical plane passing through the parallel arms 15. The curved portions 11 hereinbefore described correspond to the curve of and are adapted to overlap the portions 19 of the opposite arm 15. These portions 19 are preferably beveled as shown at 20 so as to form a neat joint with the undercut surfaces 12 of the portions 10. This overlapping is clearly indicated in Figs. 10 and 11. The adjacent portions are then welded together and the yoke as completed, as illustrated in Fig. 12, comprises a loop member formed by the arms 15 which are connected at one end by the piece 16 and which are connected at the opposite end by the portions 17 to form a hooded head 21.

It will be clearly seen that the weld by which the portions 10 and each arm are connected to the portions 19 of the adjacent arm occurs at a point which is not subject to bending but is subject only to shearing strains. It will also be seen that each side of the hood 21 is integral with the yoke arm at one of its extremities and is welded to the other yoke arm at its other extremity. There is, therefore, always integral metal in addition to the welded joint for connecting the side portions of the hood to the yoke.

Having now described my invention, what I claim and desire to secure by Letters Patent is:—

1. The method of manufacturing a hooded yoke which consists in bending one end of the bar in one direction and the opposite end of said bar in the opposite direction, then bending the bars so that portions of the opposite ends thereof overlie each other, and finally bending the said end portions in a plurality of directions so as to cause the same to engage, and welding the engaging portions.

2. The method of manufacturing draft yokes which consists in forming a bar with curved undercut ends, bending said end portions in opposite directions to form end portions each having a curved outer face, forming said bar into a loop, and finally connecting each undercut end portion of the said bar to the adjacent curved portion thereof.

3. The method of manufacturing draft yokes which consists in forging a bar to form lateral projections thereon, bending and shaping said projections so that each engages the said bar at a point spaced from said other projection and finally welding the engaging portions of said projections and thereby produce a single piece hooded yoke.

4. The method of producing a key slot in a straight bar which consists in slotting the bar, opening the said slot by the insertion of a wedge therein, and finally changing the direction of the slot by a partial rotation of the said wedge.

5. An article of manufacture comprising a hooded yoke having one of the key engaging sides of the hood formed integral with one of the yoke arms and the other key engaging side of the hood integral with the other yoke arm.

6. As an article of manufacture, a hooded yoke including a plurality of arms and having one side of the hood welded to one arm and the other side of the said hood welded to the other arm and closed slots in the said sides of the yoke.

7. As an article of manufacture, a yoke comprising a hooded head and a plurality of arms, a portion of one of the arms forming one of the key engaging sides of the said hood and a portion of the other arm forming the opposite key engaging side of the said hood.

8. As an article of manufacture, a hooded yoke comprising a hood and a plurality of arms and having one side of the said hood integral with one arm and connected to the other arm, and the opposite side of the hood integral with the opposite arm and connected to the first named arm.

9. As an article of manufacture, a yoke comprising a hooded end and a pair of arms extending rearwardly therefrom, said hooded end being provided with a key slot and each of the side walls of said hooded end being entirely formed by integral portions of the respective yoke arms.

10. As an article of manufacture, a forged yoke including a plurality of spaced arms, a portion of each arm being bent into the plane of the other arm and connected thereto.

11. The method of manufacturing draft yokes which consists in forming a bar to provide the same at opposite ends with right angle projections which extend in opposite directions, bending and shaping said projections so that each projection engages the said bar at points spaced from the other projections, and finally welding the engaging portions and bar to thereby produce a single-piece hooded yoke.

In testimony whereof I affix my signature.

B. W. KADEL.